2,836,786

VOLTAGE REGULATING APPARATUS, PARTICULARLY FOR SYNCHRONOUS MACHINES

Ernst Scharstein, Erich Schwab, and Karlheinz Lutz, Nurnberg, Germany, assignors to Siemens-Schuckertwerke Aktiengesellschaft, Berlin-Siemensstadt, Germany, a corporation of Germany Application July 21, 1954, Serial No. 444,692

Claims priority, application Germany July 21, 1953

10 Claims. (Cl. 322—25)

Our invention relates to voltage regulators for synchronous dynamo-electric machines and, more particularly, to regulating apparatus that maintain the voltage of a synchronous machine at a constant value by supplying the direct-current field winding of the machine with regulating excitation through a rectifier energized from the alternating-current line to which the machine is connected. In such regulating apparatus the excitation supplying rectifier is connected to the line through a transformer which is series-connected with impedance members whose reactive impedance is independent of the load of the synchronous machine.

It is an object of our invention to make such a regulating apparatus automatically capable of accurately maintaining a desired constant terminal voltage for any one of three different and arbitrarily chosen operating conditions of the machine. Another, more specific object is to provide a regulating apparatus that secures an accurately constant terminal voltage for a given load current regardless of whether the power factor has one or the other of two arbitrarily selected values, the terminal voltage under load being larger or smaller than the no-load voltage by an arbitrarily chosen amount. The known regulating devices of the above-mentioned kind do not secure an accurately identical terminal voltage under different power-factor conditions.

To achieve the above-mentioned objects, and in accordance with a feature of our invention, we give the reactive series impedance members between the rectifier-energizing transformer and the alternating-current line of the synchronous machine such an interconnection and impedance rating that their reactive (wattless) impedance corresponds to a predetermined magnitude of phase-displacement between the terminal voltage and the no-load excitation current of the machine, this magnitude being determined by the angle through which the ampere turns (magnetomotive force) of the field excitation rotate when passing from one arbitrarily chosen power factor to another, likewise arbitrarily chosen power factor, and by the ratio of the no-load excitation current to the excitation currents flowing at the respective power factors when the load-current has a given magnitude.

Figure 1:
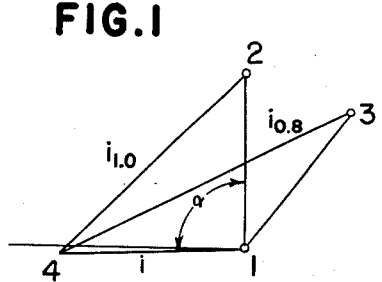
Figure 2:
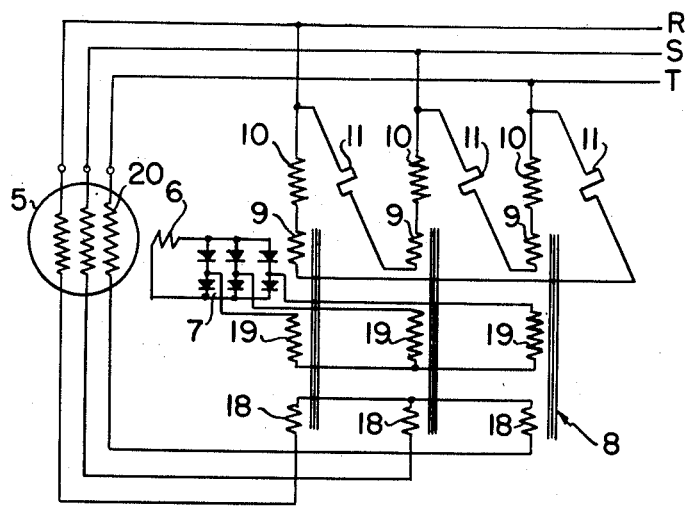
Figure 3:
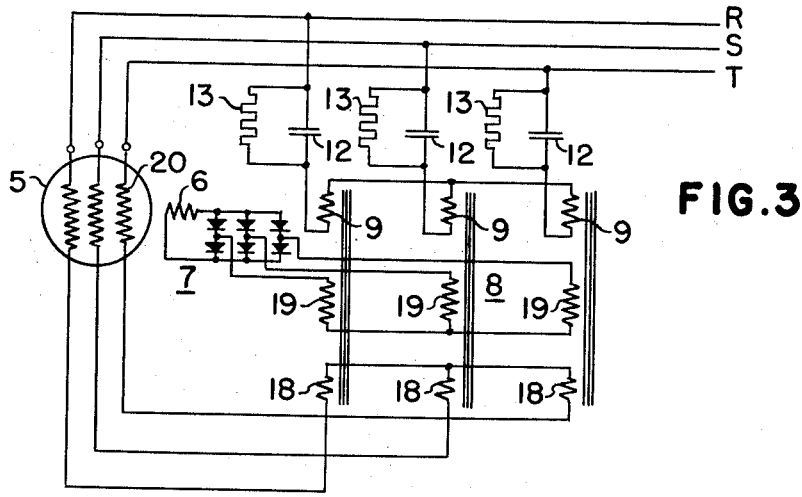
Figure 4:
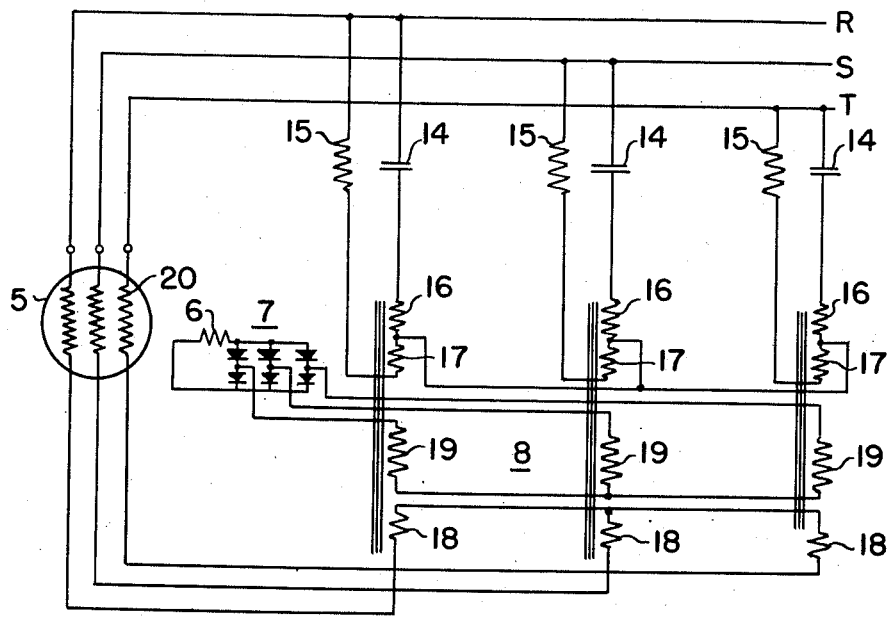

The invention will be further explained with reference to the drawings in which Fig. 1 is an explanatory vector diagram and Figs. 2 to 4 illustrate schematically the circuit diagrams of three different embodiments of the invention.

Assume, for instance, that the regulating apparatus, at the synchronous speed of the machine, is to secure accurately the same terminal voltage for the following three operating conditions:

(1) No load,
(2) Rated current and a power factor of cos $\varphi = 1.0$,
(3) Rated current and a power factor of cos $\varphi = 0.8$.

It is first necessary to determine the magnitudes of excitation currents ($i_n$, $i_{1.0}$, $i_{0.8}$) that correspond to these three operating conditions, these current magnitudes being calculated in the usual manner in accordance with the particularities of the excitation circuit and considering the reactive effect of the circuit components in that circuit. Thereafter, suitable ampere turns produced by the load current in the rectifier-energizing transformer are chosen. When passing from the power factor 1.0 to the power factor 0.8, these ampere turns rotate by a definite angle as is apparent from Fig. 1. In Fig. 1 the length of the lines $\overline{1-2}$ and $\overline{1-3}$ corresponds to the selected ampere turns for the operating conditions (2) and (3). The following condition must be satisfied:

$$\overline{1-4}:\overline{2-4}:\overline{3-4} = i_n : i_{1.0} : i_{0.8}$$

From this condition point 4 in the diagram (Fig. 1) is determined.

The length of the distance $\overline{1-4}$ directly indicates the required load-independent ampere turns, on the same scale as used for plotting the lines $\overline{1-2}$ and $\overline{1-3}$. The angle $\alpha$ between $\overline{1-2}$ and $\overline{1-4}$ indicates the required angle of phase displacement of the load-independent ampere turns relative to the terminal voltage. In the illustrated example, the angle $\alpha$ is slightly larger than 90°. To obtain this angle of phase displacement, the reactive impedances connecting the transformer with the line may consist of choke coils or reactors in star (Y) connections with ohmic resistors.

In many cases, the required angle $\alpha$ of phase displacement may be considerably larger or smaller than 90°.

For instance, if the angle is about 60°, the reactive impedances are connected as shown in Fig. 2. In Fig. 2, a three-phase synchronous alternator 5 having three stator windings 20 is to be so regulated that its terminal voltage remains accurately the same for different power factors of the load current. The excitation winding 6 of the machine 5 is energized through a rectifier 7 from a three-phase transformer 8. The transformer 8 is provided with two sets of primary windings, namely the windings 9 and the windings 18. The primary windings 9 of the transformer are connected across the buses R, S, T of the alternating-current line energized from the stator terminals of the alternator 5. The primary windings 18 of transformer 8 are Y-connected with the remaining end terminals of each of the alternator stator windings 20. The current through the primary windings 18 is thus dependent upon the load current flowing in the alternator buses R, S, T.

A group of impedance members, namely a choke coil 10 and an ohmic resistor 11, are series connected with each of the primary windings 9, and these primary windings, choke coils and resistors are interconnected in delta. In this connection, the choke coils 10 are impressed by inter-phase voltages which, depending upon the particular condition, lead or lag the respective phase voltages by 30°. Consequently, the load-independent ampere turns also rotate in phase, as compared with a Y-connection. The correct angle $\alpha$, geometrically determined as described above, is secured by correspondingly dimensioning the resistors 11. The currents in the load dependent transformer windings 18 and the load independent windings 9 of the transformer 8 thus induce in the secondary 19 thereof a resultant current which, after rectification in the rectifier 7, produces the desired predetermined D. C. currents $i_n$, $i_{1.0}$, $i_{0.8}$ for securing constant terminal voltages at full (rated) load at unity power factor, and full (rated) load at 0.8 power factor.

Although choke coils or reactors 10 are shown in the embodiment of the invention illustrated in Fig. 2, it is to be understood that capacitors could be substituted for the reactors. If the required phase displacement angle $\alpha$ is slightly smaller than 90°, a circuit connection according to Fig. 3 is preferably employed. In Fig. 3, the series impedances consist of capacitors 12 in Y-connection with the primary windings 9, and high-ohmic resistors 13 connected in parallel with the respective capacitors 12. This circuit connection is favorable when the machine is operated with a small inductive power factor because in this case the power factor is somewhat improved by the capacitors and the power requirement for the field excitation is somewhat reduced. In Fig. 3, the resistors 13, instead of being connected in parallel, could be connected in series with their respective capacitors 12.

A circuit connection according to Fig. 4 is especially favorable for providing a phase displacement angle of approximately 90°. Each phase of the primary excitation circuit comprises a capacitor 14 and a choke coil 15, both connected parallel to each other and in series with one of two primary windings 16 and 17 respectively of the transformer 8. The two windings 16 and 17 have a common midpoint connected to the midpoints of the other pairs of primary windings. With a phase displacement angle of 90°, this circuit connection has the advantage that the reactive impedances of choke coil and capacitor are equal so as to virtually eliminate any effects of heating upon the excitation winding of the machine and upon the components of the excitation circuits.

We claim:

1. With a multi-phase synchronous dynamoelectric machine having multi-phase stator windings and having a direct-current excitation winding, in combination, a terminal-voltage regulating apparatus comprising alternating-current buses connected to said respective stator windings, transformer means having two mutually isolated sets of primary windings and having secondary windings, a rectifier connected between said excitation winding and said secondary windings for energizing said excitation winding, the primary windings of one of said sets being connected with said respective stator windings to be energized by the load current of the machine, said other primary windings being multi-phase connected across said buses, impedance members series-connected with said respective other primary windings and having impedance values independent of the load current of said machine, said impedance members being electrically interconnected and said impedance values having a magnitude corresponding to a predetermined angle of phase displacement between the terminal voltage and the no-load excitation component of said excitation winding, said phase-displacement angle being determined by the amount of phase difference of the load-dependent ampere turns of said excitation winding between loads of two different selected power factors and by the ratio of the excitation currents to the no-load excitation current obtaining with said respective power factors for a given load current.

2. In voltage regulating apparatus according to claim 1, each of said impedance members comprising a reactive component and a resistive component, said impedance members together with said respective other primary windings forming a Y-connection with one another.

3. In voltage regulating apparatus according to claim 1, each of said impedance members comprising a reactor and a resistor connected in series with each other, said impedance members together with said respective other primary windings being connected in delta.

4. In voltage regulating apparatus according to claim 1, each of said impedance members comprising a capacitor and a resistor connected in parallel with each other, said impedance members together with said other primary windings being Y-connected.

5. In voltage regulating apparatus according to claim 1, each of said impedance members comprising a capacitor and a reactor, each of said other primary windings comprising a pair of opposingly-connected winding portions, the interconnection points of all of said pairs of windings being mutually interconnected, one terminal each of said capacitors and reactors being connected to respective terminals of said opposingly-connected winding portions of said other primary windings.

6. With a three-phase synchronous alternator having three alternating current output buses and having a direct-current excitation winding, in combination, an output-voltage regulating apparatus comprising transformer means having two mutually isolated sets of primary windings and having secondary windings, a rectifier connected between said excitation winding and said secondary windings for energizing said excitation winding, said primary windings of one set being series-connected in the respective phases of the alternator to be energized by the load current of the alternator, said other primary windings being multi-phase connected across said buses, three reactive impedance members series-connected with said respective other primary windings and having impedance values independent of the load of said machine, said impedance members being cyclically interconnected to form a three-phase circuit together with each other and together with said other primary windings, and the impedance values of said members having a magnitude corresponding to a predetermined angle of phase displacement between the terminal voltage and the no-load excitation component of said excitation windings, said phase-displacement angle being equal to the phase difference of the load-dependent ampere turns of said excitation winding between two different selected power factors of a given rated load current of the machine.

7. With a three-phase synchronous alternator having three alternating current output buses and having a direct-current excitation winding, in combination, an output-voltage regulating apparatus comprising transformer means having two mutually isolated sets of primary windings and having secondary windings, a rectifier connected between said excitation winding and said secondary windings for energizing said excitation winding by rectified current, said primary windings of one set being series-connected in the respective phases of the alternator to be energized by the load current of the alternator, three impedance groups series-connected with said respective other primary windings, each of said groups comprising a reactive impedance member and a resistor, and all of said impedance groups and said other primary windings forming together a three-phase circuit across said buses, said impedance groups having an impedance rated for maintaining the voltage of the alternator substantially constant at loads of respectively different power factors.

8. With a three-phase synchronous alternator having three-phase stator windings and alternating current output buses connected thereto and having a direct-current excitation winding, in combination, an output-voltage regulating apparatus comprising transformer means having two sets of three-phase primary windings and three secondary windings, a rectifier connected between said excitation winding and said secondary windings for energizing said excitation winding, one set of said primary windings being series-connected with said stator windings to be energized by the load current of the alternator, the other set of said primary windings having three pairs of windings, the two windings of each of said pairs having respective ends connected to one of said respective buses and having a common midpoint connected with the midpoints of said other pairs, a capacitor connected between one primary winding of each pair and said one bus, and an inductance coil connected between the other primary winding of each pair and said one bus.

9. With a synchronous multi-phase dynamoelectric machine having multi-phase stator windings and multi-phase terminal-voltage lines connected thereto, and having a direct-current field excitation winding, the combination of a voltage regulating system that secures a substantially constant terminal voltage for a given load current regardless of whether the power factor has one or the other of two selected values, comprising a multi-phase rectifier, multi-phase transformer means having secondary windings electrically connected through said rectifier with said field winding to energize the latter, said transformer means having a first group of multi-phase primary windings for energizing said transformer dependent upon load current in said terminal-voltage lines, said primary windings being respectively series-connected with the stator windings, said transformer means having a second group of multi-phase primary windings for energizing the transformer independently of the load current in said lines and dependent upon the terminal voltage of said lines, impedance means, each of the second group of primary windings being connected to each of said lines through said impedance means, the magnitude of said impedance being in accordance with the phase displacement angle between the terminal voltage and the current component of the no-load field excitation which angle is that through which the load-dependent ampere turns are rotated when transferring from one of said power factors to the other, and said impedance magnitude being determined in correspondence with the condition that in a vector diagram in which the length of each of the two lines (1—2) and (1—3) drawn from a common origin (1) is proportional to the load-dependent ampere turns at each of the respective power factors, and the angle between them is said phase-displacement angle, the length of a third line (1—4) drawn from said origin represents the required load-independent ampere turns, the latter length being determined by the condition that the following line lengths are in the following ratio: $(1—4):(2—4):(3—4) = i_n:i_x:i_y$, where $i_n$, $i_x$ and $i_y$ represent the respective magnitudes of the field excitation currents at no load, at a given load of power factor $x$, and at the same given load of power factor $y$.

10. With a synchronous three-phase dynamoelectric machine having three stator phase windings, and terminal-voltage lines connected thereto, and having a direct-current field excitation winding, the combination of a voltage regulating system that secures a substantially constant terminal voltage for a given load current regardless of whether the power factor has one or the other of two selected values, comprising a three-phase rectifier, a three-phase transformer means having secondary windings electrically connected through said rectifier with said field winding to energize the latter, said transformer means having a first group of three-phase primary windings for energizing said transformer dependent upon load current in said terminal-voltage lines, said stator windings being Y-connected, the said primary windings being respectively series connected between the stator windings and the zero point of the Y-connection, said transformer means having a second group of three-phase primary windings for energizing the transformer independently of the load current in said lines and dependent upon the terminal voltage of said lines, each of the second group of primary windings being connected to each of said lines through inductance means, and ohmic resistors respectively series connected with each of the second group of primary windings and with each of the inductance means, the inductance means, ohmic resistors and the second group of primary windings being in delta connection, the inductance means and ohmic resistors comprising impedance, the magnitude of said impedance being in accordance with the phase-displacement angle between the terminal voltage and the current component of the no-load excitation, which angle is that through which the load-dependent ampere turns are rotated when transferring from one of said power factors to the other, and said impedance magnitude being determined in correspondence with the condition that in a vector diagram in which the length of each of two lines (1—2) and (1—3) drawn from a common origin (1) is proportional to the load-dependent ampere turns at each of the respective power factors, and the angle between them is said phase-displacement angle, the length of a third line (1—4) drawn from said origin represents the required load-independent ampere turns, the latter length being determined by the condition that the following line lengths are in the following ratio:

$$(1—4):(2—4):(3—4) = i_n:i_x:i_y$$

where $i_n$, $i_x$, $i_y$ represent the respective magnitudes of the field excitation currents at no load ($i_n$), at a given load of power factor $x$, and at the same given load of power factor $y$.

References Cited in the file of this patent

UNITED STATES PATENTS

| | | |
|---|---|---|
| 2,454,582 | Thompson et al. | Nov. 23, 1948 |
| 2,569,302 | Forssell | Sept. 25, 1951 |
| 2,631,268 | Randsom et al. | Mar. 10, 1953 |